No. 741,757. PATENTED OCT. 20, 1903.
G. S. BAKER.
BAKER'S OVEN.
APPLICATION FILED APR. 14, 1903.
NO MODEL. 6 SHEETS—SHEET 2.
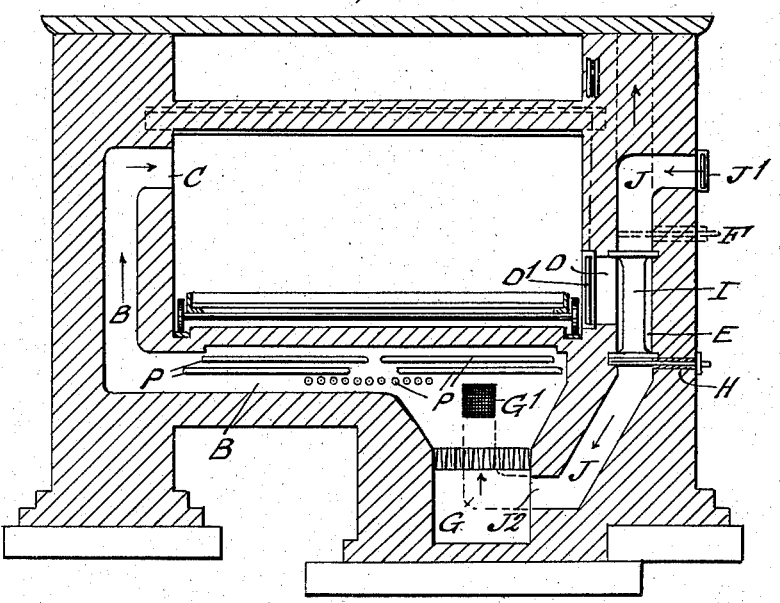
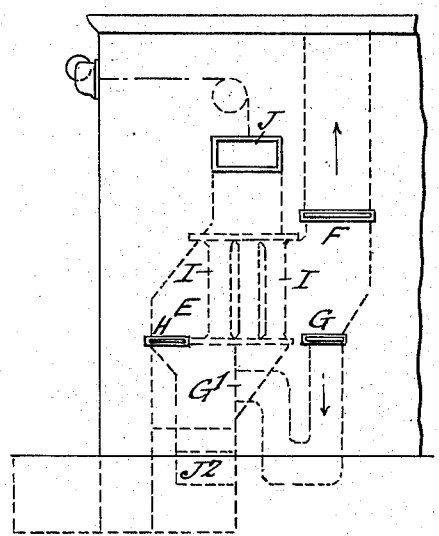 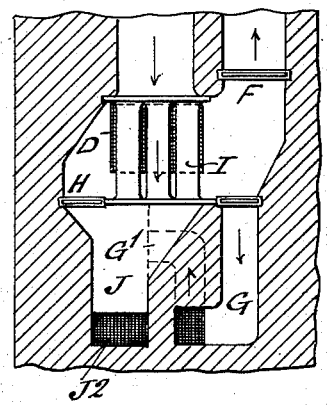
Witnesses
Inventor
George Samuel Baker
by his Attorney No. 741,757. PATENTED OCT. 20, 1903.
G. S. BAKER.
BAKER'S OVEN.
APPLICATION FILED APR. 14, 1903.
NO MODEL. 6 SHEETS—SHEET 3.
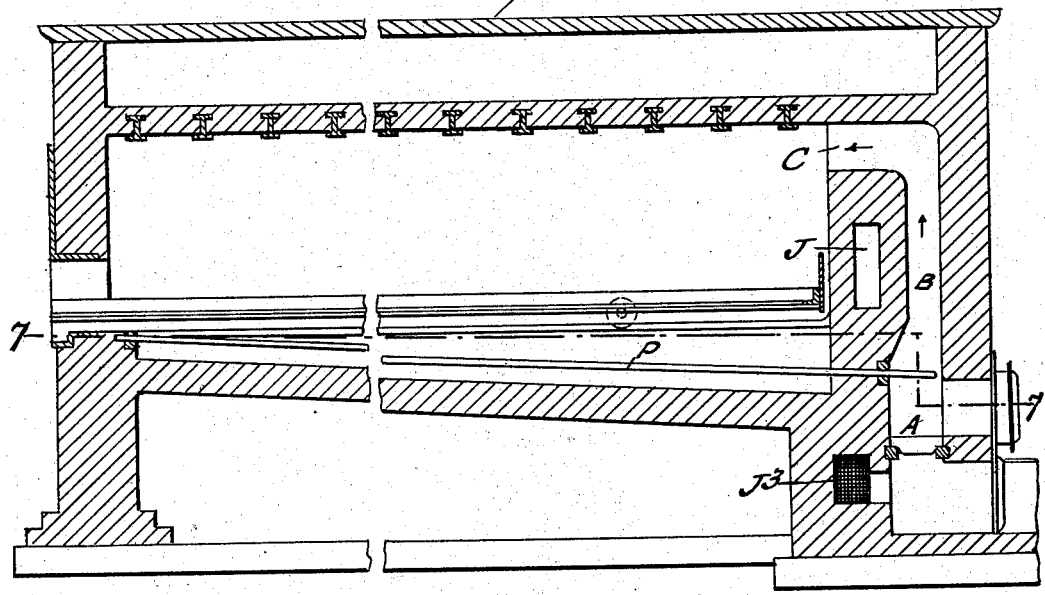
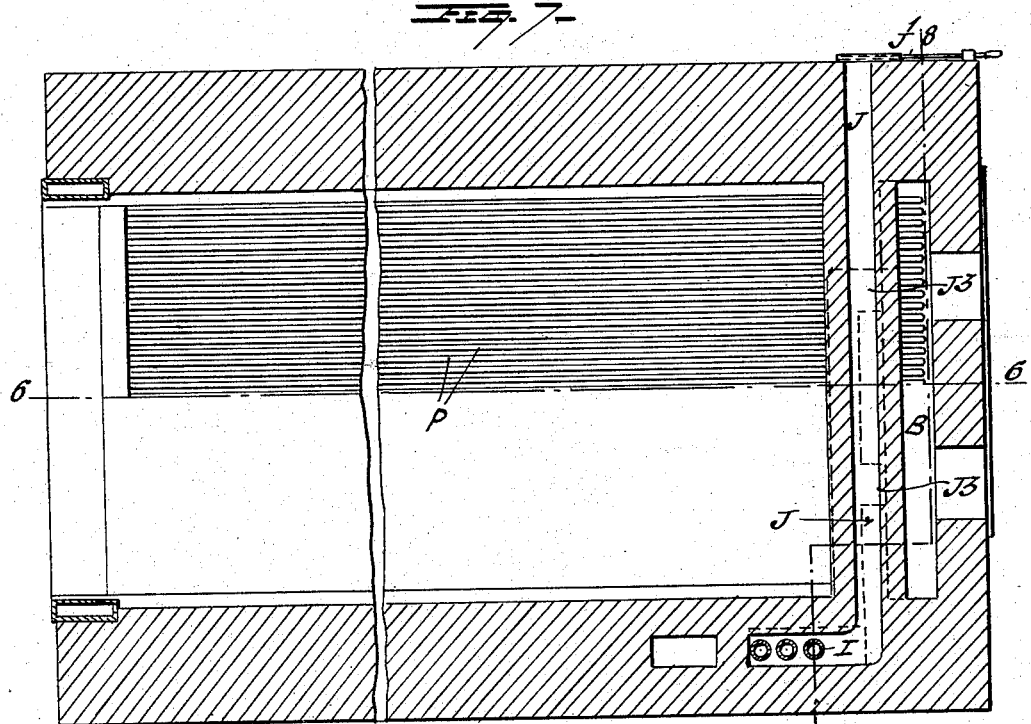

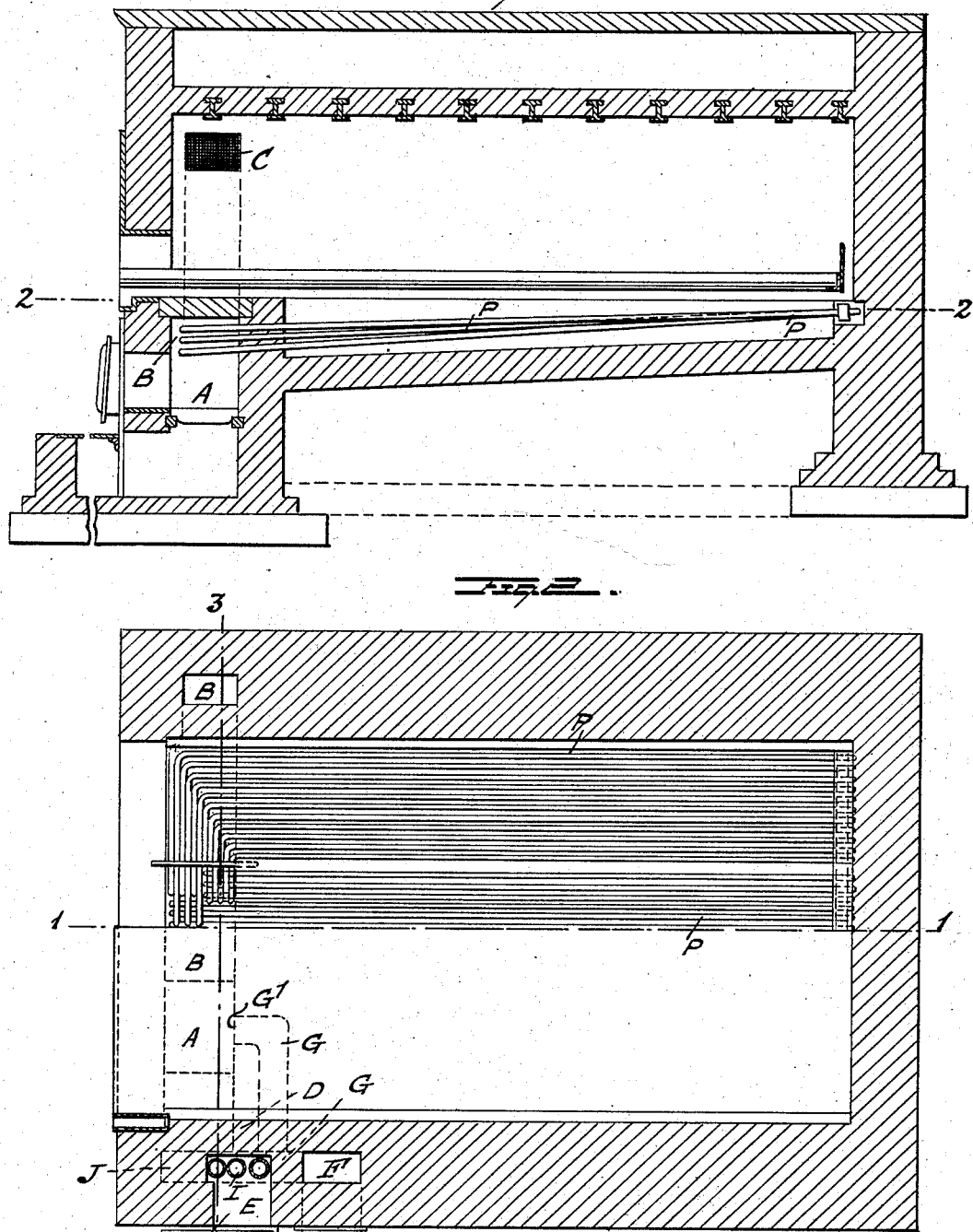

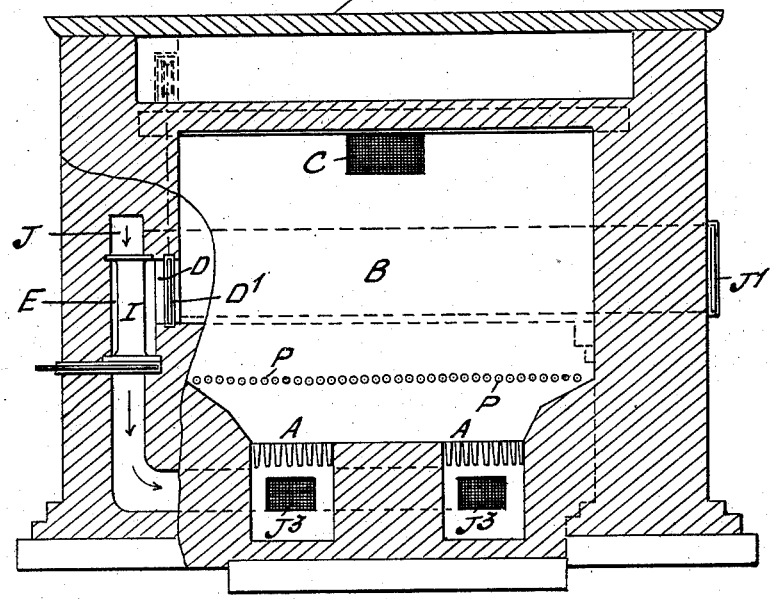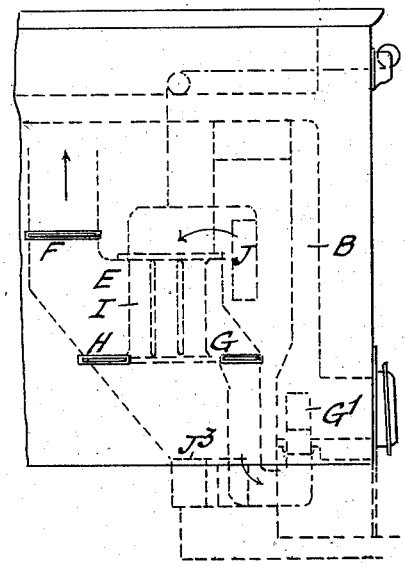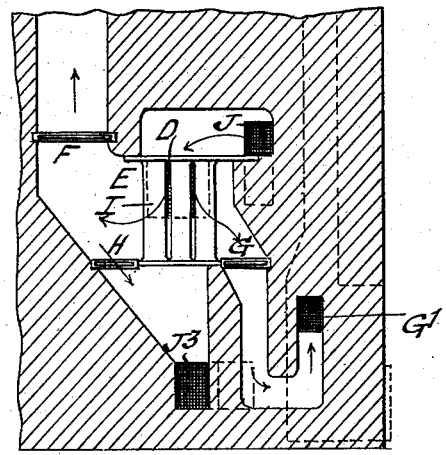

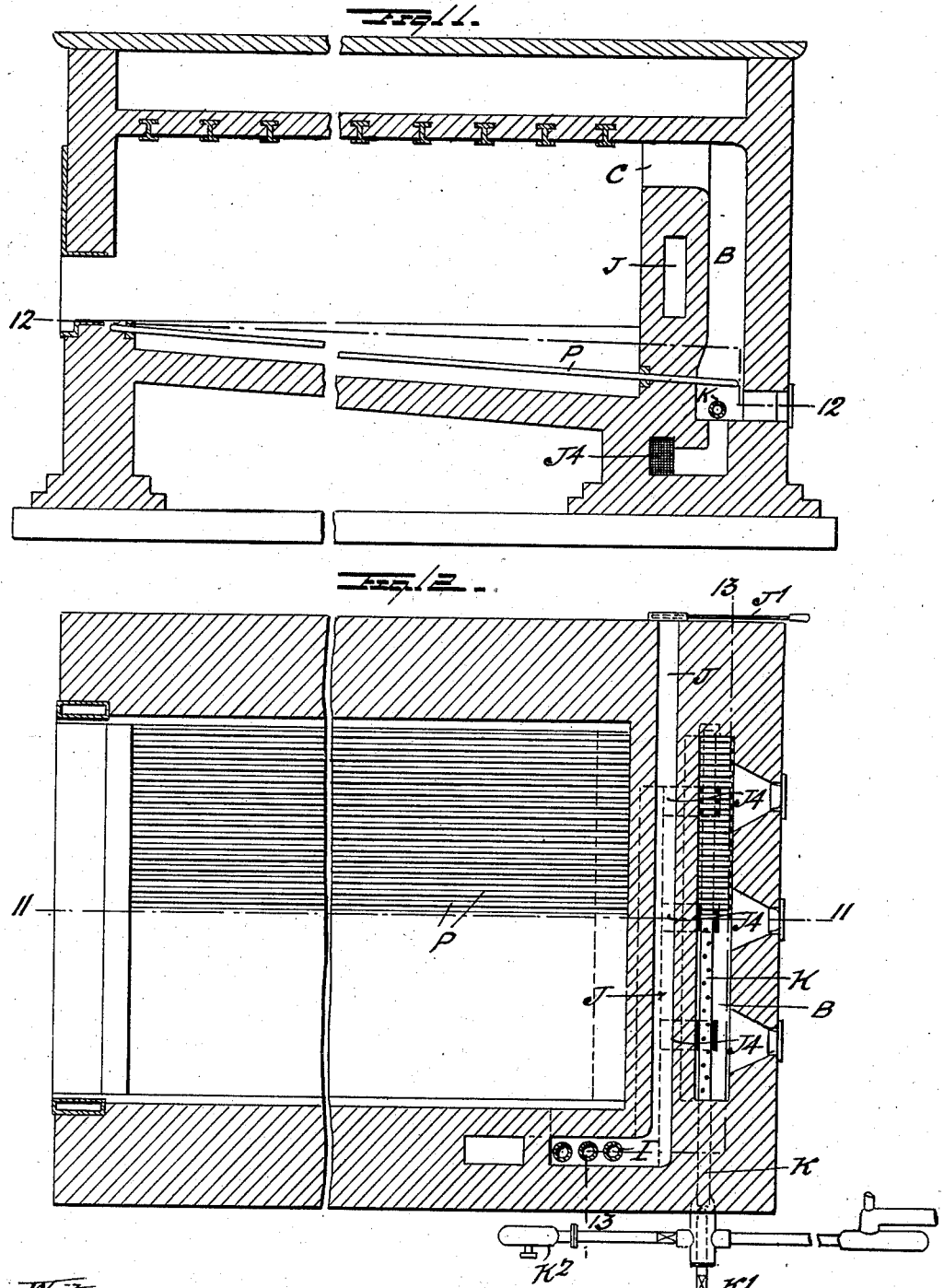

No. 741,757. PATENTED OCT. 20, 1903.
G. S. BAKER.
BAKER'S OVEN.
APPLICATION FILED APR. 14, 1903.
NO MODEL. 6 SHEETS—SHEET 6.
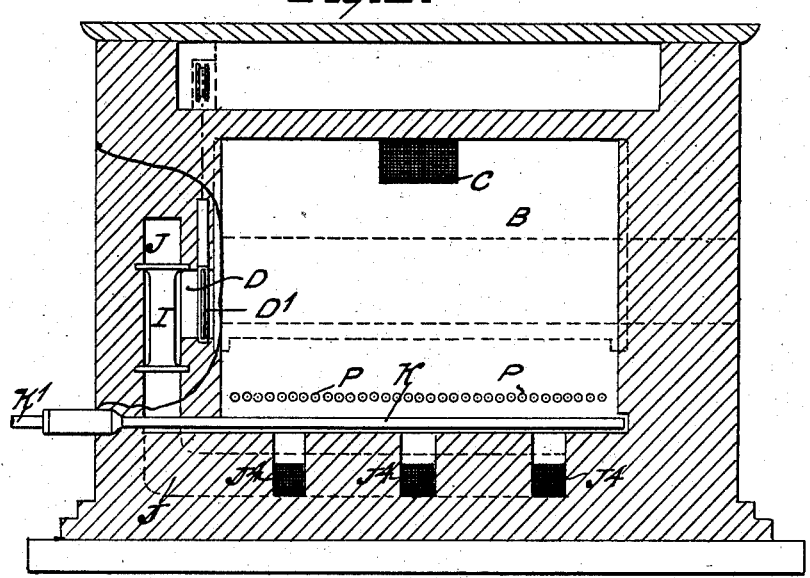
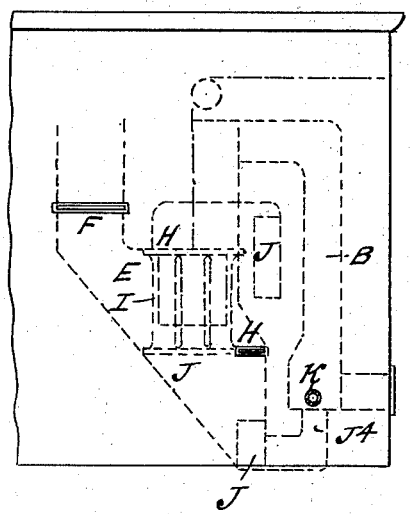
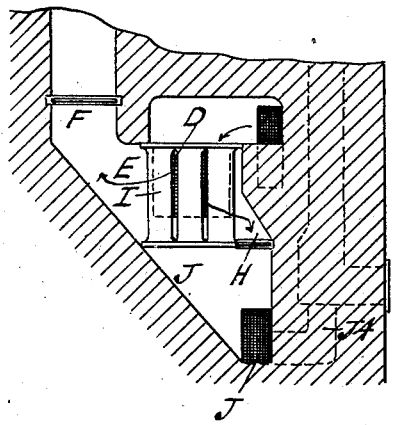
Witnesses
A. J. Haddan
F. M. Moore
Inventor
George Samuel Baker
by his Attorney R. Haddan No. 741,757. Patented October 20, 1903.

UNITED STATES PATENT OFFICE.

GEORGE SAMUEL BAKER, OF WILLESDEN JUNCTION, ENGLAND.

BAKER'S OVEN.

SPECIFICATION forming part of Letters Patent No. 741,757, dated October 20, 1903.

Application filed April 14, 1903. Serial No. 152,594. (No model.)

*To all whom it may concern:*

Be it known that I, GEORGE SAMUEL BAKER, a subject of the King of England, residing at Willesden Junction, county of Middlesex, England, have invented certain new and useful Improvements in Bakers' Ovens, of which the following is a specification.

This invention relates to bakers' ovens in which provision is made for the heating of the oven or of the goods therein by means of steam-pipes and flash heat; and it consists in the improved construction of such oven, whereby the gases from the furnace after they have passed into and from the interior of the oven may be regulated to pass in the desired proportion to the chimney and to the furnace or to either the chimney or the furnace, as may be desired at the time of use. Such gases after leaving the interior of the oven may also be used for imparting heat to incoming air for the furnace, whether said gases or a portion of them be mixed with said incoming air or not.

Three examples of the improved oven constructed according to this invention are illustrated in the annexed drawings.

Figure 1 is a longitudinal vertical section of an oven on line 1 1 of Fig. 2. Fig. 2 is a horizontal section on line 2 2, Fig. 1. Fig. 3 is a vertical cross-section on line 3 3, Fig. 2. Fig. 4 is a part side elevation showing in dotted lines the position of certain flues. Fig. 5 is a detail sectional view of said flues. Fig. 6 is a longitudinal vertical section on line 6 6, Fig. 7, of a modified oven. Fig. 7 is a horizontal section thereof on line 7 7, Fig. 6. Fig. 8 is a vertical cross-section on line 8 8, Fig. 7. Fig. 9 is a part side elevation showing in dotted lines the position of certain flues in this oven. Fig. 10 is a detail sectional view of said flues. Fig. 11 is a longitudinal vertical section on line 11 11, Fig. 12, of a further modified oven. Fig. 12 is a horizontal section on line 12 12 of Fig. 11. Fig. 13 is a vertical cross-section on line 13 13, Fig. 12. Fig. 14 is a part side elevation showing in dotted lines the position of certain flues in the oven. Fig. 15 is a detail sectional view of said flues.

The oven illustrated in Figs. 1 to 5 has the heating-furnace at the front end. The sole of the oven is heated by Perkins' tubes P, the outerlying tubes being curved to bring their ends above those of the innerlying tubes in the flue B, into which the combustion-space A of the furnace opens, as shown more clearly in Fig. 3. The flue B extends across the front end of the sole of the oven and at one end is continued into the side wall of the oven and ascends vertically or otherwise therein and opens into the interior space of the oven at C at any desired place, but preferably near the top of the oven. At some other desired place on the wall of the interior of the oven, but preferably at a low level and preferably comparatively near the furnace, there is an outlet D for the furnace-gases that have passed through the interior of the oven. This outlet D is controlled by a damper D', which may be arranged to rise and fall in a vertical plane. The outlet D leads into a chamber E in the oven-wall, which is traversed by pipes I or other form of heat-interchanger forming part of the cold-air-inlet flue. From said chamber E there are three outlets, each controlled by a damper—namely, one outlet, F, leading to the chimney, one outlet, G, leading to the furnace and entering, preferably, at the back wall of the combustion-space, as shown at G' in Fig. 3, and the third outlet, H, leading into the air-inlet flue. The air-inlet flue J, having a controlling-damper J', passes from a suitable place of the exterior of the oven to the heat-interchanger I and thence to the furnace, which it enters laterally beneath the grate at $J^2$.

The oven illustrated in Figs. 6 to 10 has its heating-furnace at the rear end and is shown as provided with two furnace-grates. The flue B is of the same width and height as the interior space of the oven and has its outlet C into the interior of the oven at the middle of the rear end of the oven. The outlet D for gases from the oven and the chamber E, with its outlets F G H, dampers thereto, and heat-interchanger I, are the same as above described with reference to the oven illustrated in Figs. 1 to 5, except that they are placed near to the rear wall of the oven in Figs. 6 to 10 to correspond with the location of the furnace. The air-flue J is in this case shown as passing across from the opposite side of the oven through the thickness of the rear wall of the interior of the oven. After passing the heat-interchanger it leads to openings J² J³ beneath the level of and behind the respective grates. The opening G' of the flue G is situated laterally of one of the grates above the grate-level.

Figs. 11 to 15 illustrate a gas-fired oven with the furnace at the rear end; but this furnace may also be placed at any other convenient position. The atmospheric burner-pipe K extends across beneath the ends of the Perkins' tubes and is supplied by gas from nozzle K' and air from a blower K² or by "producer" or other gas according to the manner usually employed for burning any such gas. The air-flue is shown as having three ports J⁴ J⁴ J⁴, in front of which are inspection-openings closed by doors. The flue G and its damper G' are omitted.

The arrangement of flues in these three ovens, as above described, enables the furnace-gases to be used not only first for heating the Perkins' tubes, but afterward for flash heat in the interior of the oven. After they have passed through the oven they may pass wholly to the chimney or part of them may be passed to the chimney and the remainder may be again passed through the furnace in intermixture with the incoming air. The flue G may be used occasionally when the fires are damped down, the damper regulating the waste heat to the chimney being closed. The gases then circulate over and again through the furnace and oven. The flue G can also, if required, be employed for direct communication from the furnace to the chimney.

In the example in Figs. 11 to 15 part of the flue J can be used in place of the flue G, the dampers F and J' being closed and damper H opened.

I do not claim, broadly, the use of the furnace-gases for flash heat in the interior of the oven after they have been used for heating Perkins' tubes; but

I claim—

1. A baker's oven intended to be heated by use of Perkins' tubes and by flash heat, having flues comprising a flue for heating the Perkins' tubes and leading thereafter directly into the interior of the oven, a damper-controlled flue from the interior of the oven to a chamber whence a damper-controlled flue leads to the chimney and another damper-controlled flue for return of furnace-gases leads to the furnace, said flues being arranged substantially as and for the purpose set forth.

2. A baker's oven intended to be heated by use of Perkins' tubes and by flash heat, having flues comprising a flue for heating the Perkins' tubes and leading thereafter directly into the interior of the oven, a damper-controlled flue from the interior of the oven to a chamber whence a damper-controlled flue leads to the chimney, and another damper-controlled flue for the return of furnace-gases leads to the furnace, a heat-interchanger located in said chamber, and forming a part of an air-flue to the furnace substantially as and for the purpose set forth.

3. A baker's oven intended to be heated by use of Perkins' tubes and by flash heat, having flues comprising a flue for heating the Perkins' tubes and leading thereafter directly into the interior of the oven, a damper-controlled flue from the interior of the oven to a chamber whence a damper-controlled flue leads to the chimney and another damper-controlled flue for return of furnace-gases leads to the furnace a heat-interchanger located in said chamber and forming a part of an air-flue to the furnace, and a damper-controlled flue leading from said chamber into said air-flue substantially as and for the purpose set forth.

4. A baker's oven intended to be heated by use of Perkins' tubes and by flash heat, having flues comprising a flue for heating the Perkins' tubes and leading thereafter directly into the interior of the oven, a damper-controlled flue from the interior of the oven to a chamber whence a damper-controlled flue leads to the chimney, a heat-interchanger located in said chamber and forming a part of an air-flue to the furnace and a damper-controlled flue leading from said chamber into said air-flue substantially as and for the purpose set forth.

In witness whereof I have signed this specification in the presence of two witnesses.

GEORGE SAMUEL BAKER.

Witnesses:
  WALTER J. SKERTEN,
  W. J. NORWOOD.